United States Patent
Cropper et al.

(10) Patent No.: US 10,250,488 B2
(45) Date of Patent: Apr. 2, 2019

(54) LINK AGGREGATION MANAGEMENT WITH RESPECT TO A SHARED POOL OF CONFIGURABLE COMPUTING RESOURCES

(71) Applicant: International Business Machines Corporation, Armonk, NY (US)

(72) Inventors: Joseph W. Cropper, Rochester, MN (US); Taylor D. Peoples, Austin, TX (US); Jeffrey W. Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 15/058,143

(22) Filed: Mar. 1, 2016

(65) Prior Publication Data

US 2017/0257308 A1    Sep. 7, 2017

(51) Int. Cl.
*H04L 29/08* (2006.01)
*H04L 12/709* (2013.01)

(52) U.S. Cl.
CPC ............ *H04L 45/245* (2013.01); *H04L 67/02* (2013.01); *H04L 67/10* (2013.01); *H04L 67/22* (2013.01); *H04L 67/2833* (2013.01)

(58) Field of Classification Search
CPC .............................. H04L 45/245; H04L 67/10
See application file for complete search history.

(56) References Cited

U.S. PATENT DOCUMENTS

| | | | |
|---|---|---|---|
| 8,483,046 B2 | 7/2013 | DeCusatis | |
| 9,935,831 B1 * | 4/2018 | Wundsam | H04L 41/0823 |
| 2008/0123559 A1 * | 5/2008 | Haviv | G06F 8/61 |
| | | | 370/255 |
| 2012/0042095 A1 * | 2/2012 | Kotha | H04L 12/56 |
| | | | 709/233 |
| 2012/0158923 A1 | 6/2012 | Mohamed et al. | |
| 2012/0166360 A1 * | 6/2012 | Shah | G06Q 30/0283 |
| | | | 705/400 |
| 2012/0179922 A1 * | 7/2012 | Mehrotra | G06F 1/3278 |
| | | | 713/300 |
| 2014/0198656 A1 * | 7/2014 | Venkatesh | H04L 47/125 |
| | | | 370/235 |
| 2014/0201564 A1 * | 7/2014 | Jagtiani | G06F 11/203 |
| | | | 714/4.11 |

(Continued)

OTHER PUBLICATIONS

Mell, Peter, et al., The NIST Definition of Cloud Computing, National Institute of Standards and Technology, Oct. 7, 2009, Version 15, NIST, Gaithersburg, MD, US.

(Continued)

*Primary Examiner* — Wing F Chan
*Assistant Examiner* — Billy H Ng
(74) *Attorney, Agent, or Firm* — David B. Woycechowsky

(57) ABSTRACT

Disclosed aspects relate to managing link aggregation with respect to a shared pool of configurable computing resources. A set of workloads of the shared pool of configurable computing resources can be monitored to identify a set of networking data. Based on the set of networking data, a link aggregation arrangement for dynamic adjustment may be determined. The link aggregation arrangement may be established by dynamic adjustment with respect to the shared pool of configurable computing resources.

18 Claims, 10 Drawing Sheets

(56) References Cited

U.S. PATENT DOCUMENTS

| | | | |
|---|---|---|---|
| 2014/0280801 A1* | 9/2014 | Cardona | H04L 47/127 709/221 |
| 2014/0289411 A1* | 9/2014 | Bornstein | G06F 9/54 709/226 |
| 2015/0006716 A1* | 1/2015 | Suchter | G06F 9/5038 709/224 |
| 2015/0263991 A1 | 9/2015 | Macchiano et al. | |
| 2016/0065479 A1* | 3/2016 | Harper | H04L 47/125 370/235.1 |

OTHER PUBLICATIONS

Yao, J. et al.; "Fair link striping with FIFO delivery on heterogeneous channels"; Computer Communications, vol. 31, No. 14, pp. 3427-3437; Sep. 2008.

Salah, K. et al.; "Estimating service response time for elastic cloud applications"; Proceedings of the 2012 IEEE 1st Internat'al Conference on Cloud Networking, pp. 2-16; 2012.

Anonymously; "Optimized distributed solution for LACP (Link Aggregation Control Protocol)"; http;//ip.com/IPCOM/000233287; Dec. 5, 2013.

Anonymously; "One way to optimize link aggregation load balance base on local preference"; http://ip.com/IPCOM/000237301; Jun. 12, 2014.

Internet Society RFCs et al.; "Mechanisms for Optimizing Link Aggregation Group (LAG) and Equal-Cost Multipath (ECMP) Component Link Utilization in Networks"; http://ip.com/IPCOM/000240239; Jan. 1, 2015.

Wikimedia Foundation, Inc.; "Link aggregation"; <https://en.wikipedia.org/wiki/Link_aggregation>.

Microsoft; "Network Load Balancing Technical Overview"; <https://msdn.microsoft.com/en-us/library/Bb742455.aspx>.

Cisco; "Link Aggregation Control Protocol (LACP) (802.3ad) for Gigabit Interfaces" <http://www.cisco.com/c/en/us/td/docs/ios/12_2sb/feature/guide/gigeth.html>.

Citrix; "LACP Bonding in XenServer—Configuration and Troubleshooting"; <http://support.citrix.com/article/CTX135690>.

Microsoft; "User Guide for NIC Teaming (LBFO)"; <http://www.microsoft.com/en-us/download/confirmation.aspx?id=40319>.

Backdrift; "LACP—How to Configure Network Bonding in Linux"; <http://backdrift.org/lacp-configure-network-bonding-linux>.

Cisco; "Configuring Link Aggregation"; <http://www.cisco.com/c/en/us/td/does/server_nw_virtual/2-10-0_release/configuration/guide/swcg210/3link.html#wp969022>.

Nagios Enterprises, LLC; "Network flow analysis, monitoring, and bandwidth utilization made easy"; <https://www.nagios.com/products/nagios-network-analyzer/>.

* cited by examiner

LINK AGGREGATION MANAGEMENT WITH RESPECT TO A SHARED POOL OF CONFIGURABLE COMPUTING RESOURCES

BACKGROUND

This disclosure relates generally to computer systems and, more particularly, relates to managing link aggregation with respect to a shared pool of configurable computing resources. The amount of data that needs to be managed by enterprises is increasing. Link aggregation may be desired to be performed as efficiently as possible. As data needing to be managed increases, the need for efficient link aggregation management may increase.

SUMMARY

Aspects of the disclosure relate to dynamic configuration of link aggregation groupings for workloads of a cloud computing environment. Adjustments to the link aggregation groupings may be made automatically based on the workloads by monitoring applications running in a computing system to identify networking requirements and adjusting link aggregations dynamically using the identified networking requirements. Stated differently, network utilization and performance data for one or more cloud computing workloads can be monitored and evaluated to determine network configurations conducive to the operations and characteristics of the workloads. As such, based on the network monitoring and evaluation, the compute nodes, network switches, and other network components of the cloud computing environment may be configured to establish a link aggregation arrangement for the set of workloads.

Aspects of the disclosure relate to managing link aggregation with respect to a shared pool of configurable computing resources. A set of workloads of the shared pool of configurable computing resources can be monitored to identify a set of networking data. In embodiments, the networking data may include network requirements, network activity, and other data regarding the performance of the set of workloads. Based on the set of networking data, a link aggregation arrangement for dynamic adjustment may be determined. The link aggregation arrangement may be established by dynamic adjustment with respect to the shared pool of configurable computing resources. Configuring the link aggregation arrangement may include configuring one or more network interface cards, network switches, or domain name systems based on the characteristics of the set of workloads.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
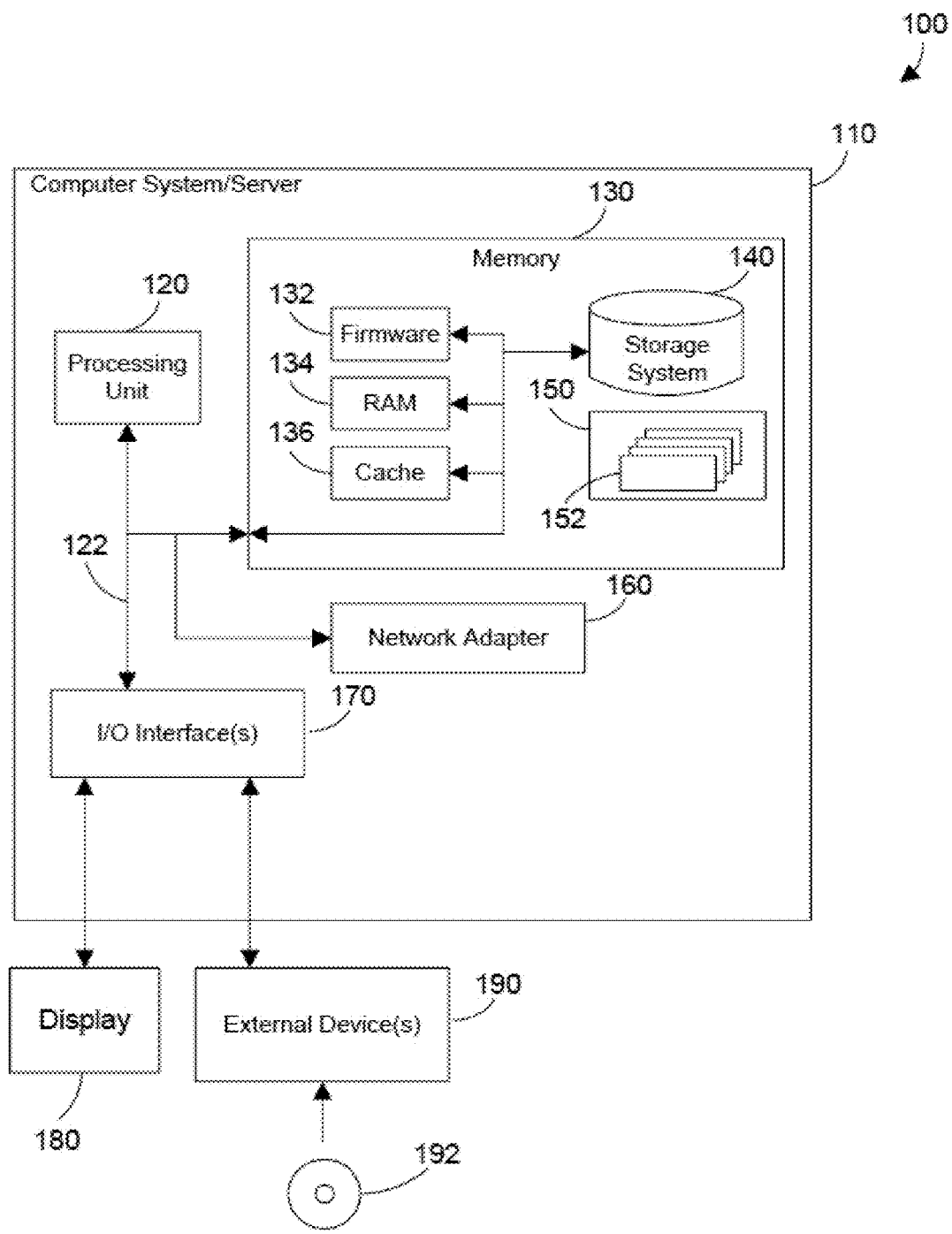
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to dynamic configuration of link aggregation groupings for workloads of a cloud computing environment. Adjustments to the link aggregation groupings may be made automatically based on the workloads by monitoring applications running in a computing system to identify networking requirements and adjusting link aggregations dynamically using the identified networking requirements. Stated differently, network utilization and performance data for one or more cloud computing workloads can be monitored and evaluated to determine network configurations conducive to the operations and characteristics of the workloads. As such, based on the network monitoring and evaluation, the compute nodes, network switches, and other network components of the cloud computing environment may be configured to establish a link aggregation arrangement for the set of workloads. Accordingly, dynamic configuration of link aggregation groups based on the changing network requirements of cloud computing workloads can be leveraged to promote network flexibility, and reduce the need for intervention by network administrators.

In cloud computing, compute nodes can serve a wide range of workloads (e.g., web servers, database servers, backup servers). Each of these types of servers may have different network input/output characteristics, and may experience improved performance if the network infrastructure is configured in such a way as to facilitate the operations and unique characteristics of each workload. Link aggregation is one tool that is available to cloud providers to promote flexibility in network infrastructure. By combining a number of physical network ports (e.g., of a compute node) together to establish a single-high-bandwidth data path, traffic loads may be shared among the member ports in the group and connection reliability may be enhanced. However, as the workloads handled by a given compute node/set of network hardware change, it can become burdensome for network providers to manually reconfigure the network infrastructure to take advantage of link aggregation for each new network configuration.

For instance, consider the following example. A network infrastructure may be initially configured to operate five unique web servers for five different enterprises. Accordingly, in such a configuration, it may be beneficial to make use of five physical network interface cards (NICs) without any link aggregation enabled such that each web server's traffic may be isolated from one another. However, subsequently, the same network infrastructure may be reconfigured to support a deployment including one high-volume virtual machine for database backup. In such a configuration, it may be beneficial to aggregate the five NICs into a single data pathway to increase network throughput.

Accordingly, aspects of the disclosure relate to dynamically configuring the physical network resources of a given network infrastructure to adapt it to the characteristics of the cloud computing workloads it currently supports. For example, aspects of the disclosure relate to configuring the Ethernet ports on a compute host and a layer 2 (L2) network switch between link aggregation (LAG) mode and non-LAG mode as appropriate to the characteristics of the cloud computing workloads. Such a configuration may be associated with improved network load-balancing, data redundancy, network speed, and performance.

Aspects of the disclosure include a method, system, and computer program product for managing link aggregation with respect to a shared pool of configurable computing resources. A set of workloads of the shared pool of configurable computing resources may be monitored to identify a set of network data. The set of workloads may be running or otherwise active. In various embodiments, the set of workloads can include web servers, database servers, or backup servers. In embodiments, the set of workloads may be based on a monitoring criterion such as a temporal period, a threshold physical bandwidth factor, or a resource change with respect to the shared pool of configurable computing resources.

Determination of a link aggregation arrangement for dynamic adjustment with respect to the shared pool of configurable computing resources can be made. The link aggregation arrangement may include a configuration of a set of network interface controllers (NICs) or a configuration of a set of network switches. Determining the link aggregation arrangement may be based on the set of networking data. The link aggregation arrangement may be configured to be modified in response to a change to the set of workloads. In embodiments, the set of networking data includes a set of workload data which indicates a workload-type, network utilization/activities, or a user-specification. Dynamic adjustment may include a configuration of a set of domain name system (DNS) servers.

The link aggregation arrangement can be established by dynamic adjustment with respect to the shared pool of configurable computing resources. In embodiments, establishing the link aggregation arrangement may include configuring a set of network interface controllers (NICs), a set of network switches, and a set of domain name system (DNS) servers. In certain embodiments, establishing the link aggregation arrangement may be performed in response to detecting the set of networking data indicates a threshold ripeness value to initiate dynamic adjustment. The threshold ripeness value may indicate a running workload inefficiency. Altogether, establishing the link aggregation arrangement can positively impact (e.g., reduce) a physical bandwidth factor.

The monitoring of the set of network data, determining of the link aggregation, and establishing of the link aggregation may each occur in an automated fashion without user intervention. Altogether, performance or efficiency benefits with respect to a shared pool of configurable computing resources may occur (e.g., speed, flexibility, responsiveness, resource usage, productivity). Aspects may save or facilitate conservation of computing resources such as bandwidth, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, or the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
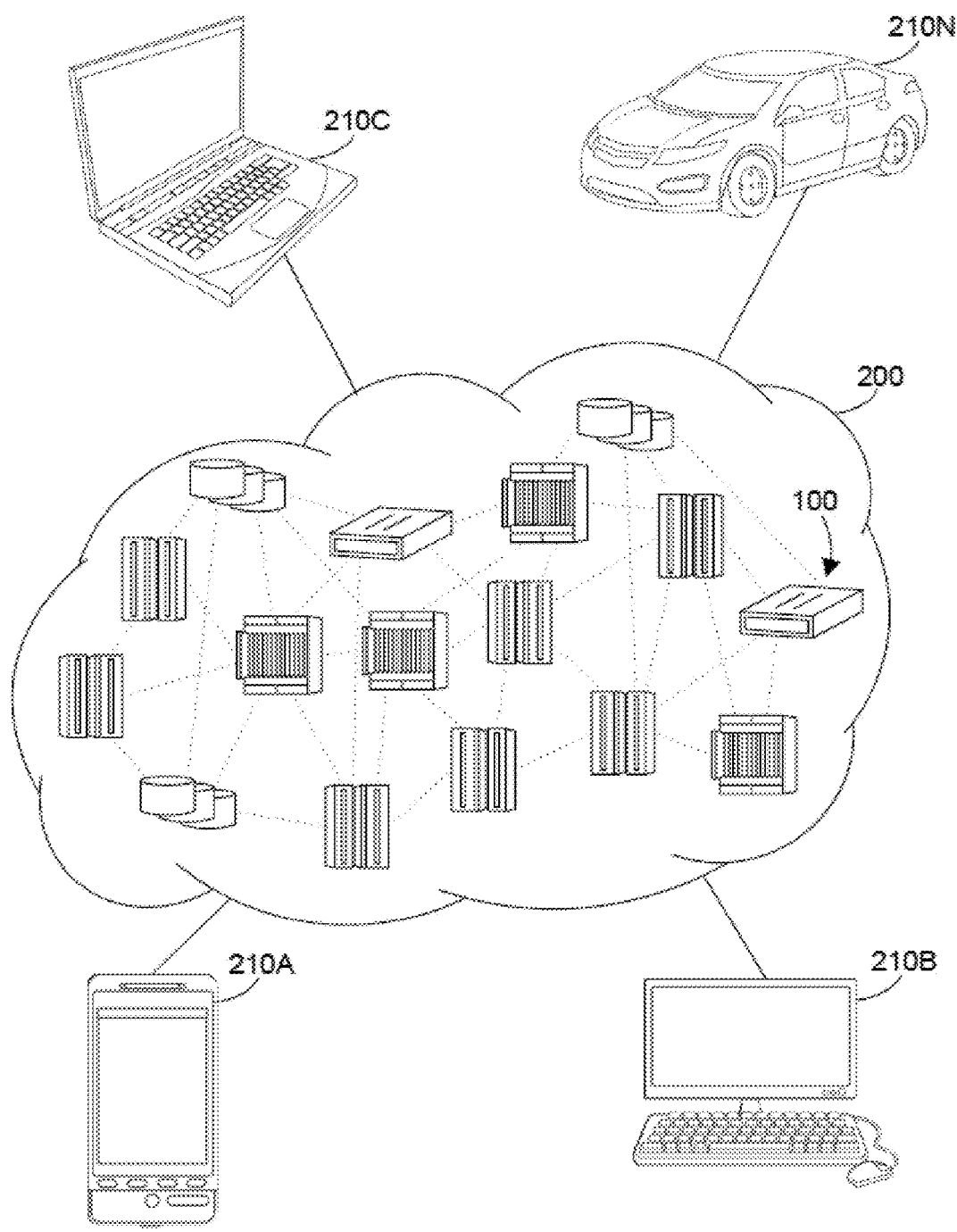
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
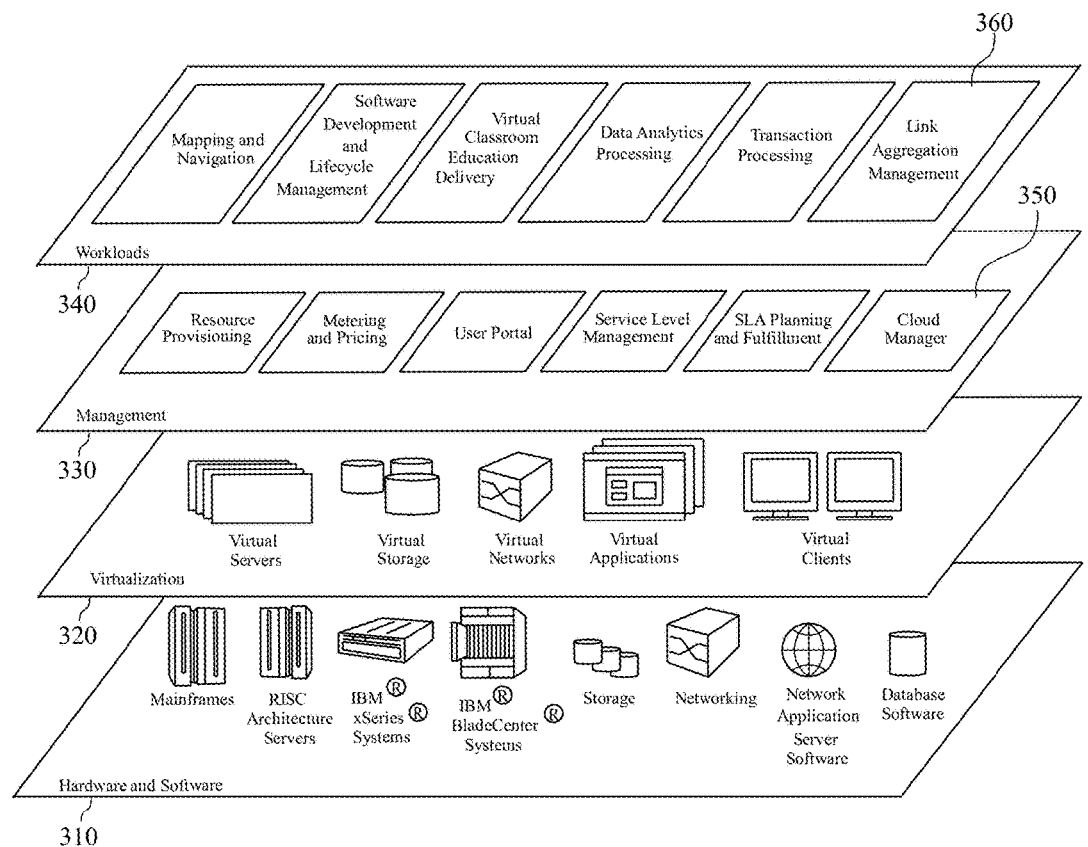
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a link aggregation arrangement 360, which may be utilized as discussed in more detail below.

Figure 4:
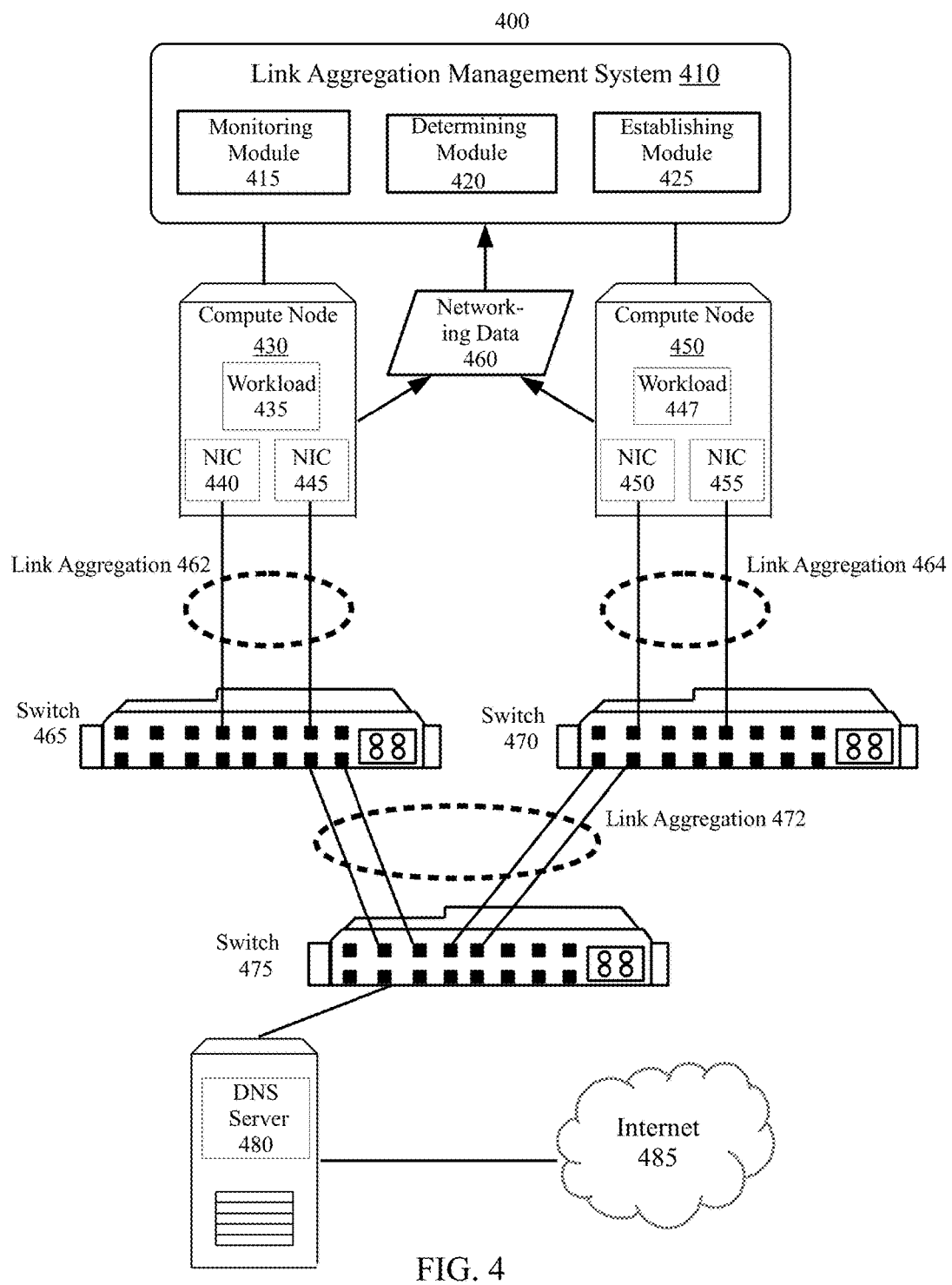
FIG. 4 is a flowchart illustrating a method of managing link aggregation with respect to a shared pool of configurable computing resources according to embodiments.

FIG. 4 is a system illustrating an example network infrastructure 400 for link aggregation management, according to embodiments. As shown in FIG. 4, the network infrastructure may include a link aggregation management system 410, a monitoring module 415, a determining module 420, an establishing module 425, compute nodes 430 and 450, workloads 435 and 447, NICs 440, 445, 450, and 455, networking data 450, network switches 465, 470, and 475, domain name system server (DNS) 480, internet 485, and link aggregations 462, 464, and 472. Together, the illustrative components of FIG. 4 may be used to facilitate link aggregation management.

In computer networking, the process of combining (e.g., aggregating) multiple network connections in parallel in order to increase network throughput may be termed link aggregation. A LAG (Link Aggregation Group) combines a number of physical ports together to make a single-high-bandwidth data path so as to implement the traffic load sharing among the member ports in the group and to enhance the connection reliability. Aspects of the present disclosure relate to dynamically managing a link aggregation arrangement (e.g., the configuration of network resources such as physical hardware ports, network switches, DNS server settings, and compute node settings included in a LAG) without manual intervention from a user or network administrator. Aspects of the disclosure relate to both the aggregation of multiple connections into a single data path as well as the division of a single (aggregated) connection into a plurality of individual connections.

The link aggregation management system 410 may be configured to implement various aspects of link aggregation management. Monitoring module 415 may be configured to monitor a set of workloads to identify a set of networking data. For instance, the monitoring module 415 may be configured to monitor workload 435 and workload 447 of compute nodes 430 and 450, respectively. Generally, the workloads may include virtual machines, tasks, jobs, or other operations deployed on the compute nodes. By monitoring the set of workloads, the monitoring module may identify a set of networking data 450. The networking data 450 may include data and information regarding the characteristics of the workloads (e.g., network activity, incoming/outing traffic, type of workload). Based on the networking data, the determining module 420 may be configured to determine a link aggregation arrangement for dynamic adjustment with respect to the shared pool of configurable computing resources. More particularly, determining the link aggregation arrangement may include analyzing the networking data to ascertain a network configuration (e.g., link aggregation arrangement) that facilitates the requirements of the workloads. As an example, the determining module 420 may ascertain a configuration of network interface cards, network switches, and DNS settings conducive to a link aggregation connection.

Establishing module 425 may be configured to establish the link aggregation arrangement by dynamic adjustment with respect to the shared pool of configurable computing resources. Generally, establishing may include initiating, instantiating, implementing, or configuring the network interface cards, network switches, DNS settings, and other network components based on the link aggregation arrangement determined by determining module 420. As an example, the establishing module 425 may configure NIC 440 and NIC 445 as well as the respective network ports on network switch 465 to link aggregation mode.

As shown in FIG. 4, the example network infrastructure 400 may include a plurality of network switches (e.g., 465, 470, 475) as well as a plurality of link aggregation arrangements (e.g., link aggregation 462, link aggregation 464, and link aggregation 472). As described herein, each link aggregation arrangement may serve to configure a plurality of NICs of a compute node to function as a single high-bandwidth data path. For instance, as FIG. 4 illustrates, NIC 440 and NIC 445 of compute node 430 may be configured to connect to switch 465 via link aggregation 462, and NIC 450 and NIC 455 may be configured to connect to switch 470 via link aggregation 464. Further, the output of switch 465 and switch 470 may be configured to connect to switch 475 via link aggregation 472. In embodiments, switch 475 may be configured to access the internet 485 via DNS server 480. As described herein, the DNS records of DNS server 480 may be updated to accurately refer to the internet protocol (IP) addresses of the aggregated NICs. In addition to the configuration depicted in FIG. 4, other methods of configuring the network infrastructure 400 and the link aggregation arrangements are also possible.

Aspects of the disclosure, in embodiments, relate to assigning a first link aggregation protocol to a first set of virtual environments (e.g., virtual machines, logical partitions) based on a first quality of service and a first set of redundancy criteria, and assigning a second link aggregation protocol to a second set of virtual environments based on a second quality of service and a second set of redundancy criteria. In embodiments, the first set of virtual environments may support a first deployment and the second set of virtual environments may support a second deployment. As an example, the virtual environments may be part of a cloud computing leasing model offered by a cloud computing provider, where the virtual environments are configured to host workloads deployed by end users.

Generally, the quality of service may include a quantitative standard that measures the quality of the network performance offered to end users. For instance, the quality of service may be measured in terms of error rates, bandwidth, throughput, bit rates, transmission delays, resource availability, and other such factors. In embodiments, a variety of quality of service levels may be offered to consumers at different pricing tiers (e.g., higher quality guarantees may be provided at higher pricing points). The set of redundancy criteria may include one or more stipulated requirements (e.g., by the end user) regarding the backup/data redundancy capabilities of a particular network configuration. The link aggregation protocol may include a set of rules or guidelines for the establishment of a link aggregation arrangement. For example, a link aggregation protocol may include stipulations and requirements regarding the type of hardware, bandwidth characteristics, and other network properties that may be included in the link aggregation network so as to assure that the quality of service is maintained at a particular threshold level. Different link aggregation protocols may be assigned to virtual environments based on the set of redundancy criteria and quality of service level requested by the end user.

Figure 5:
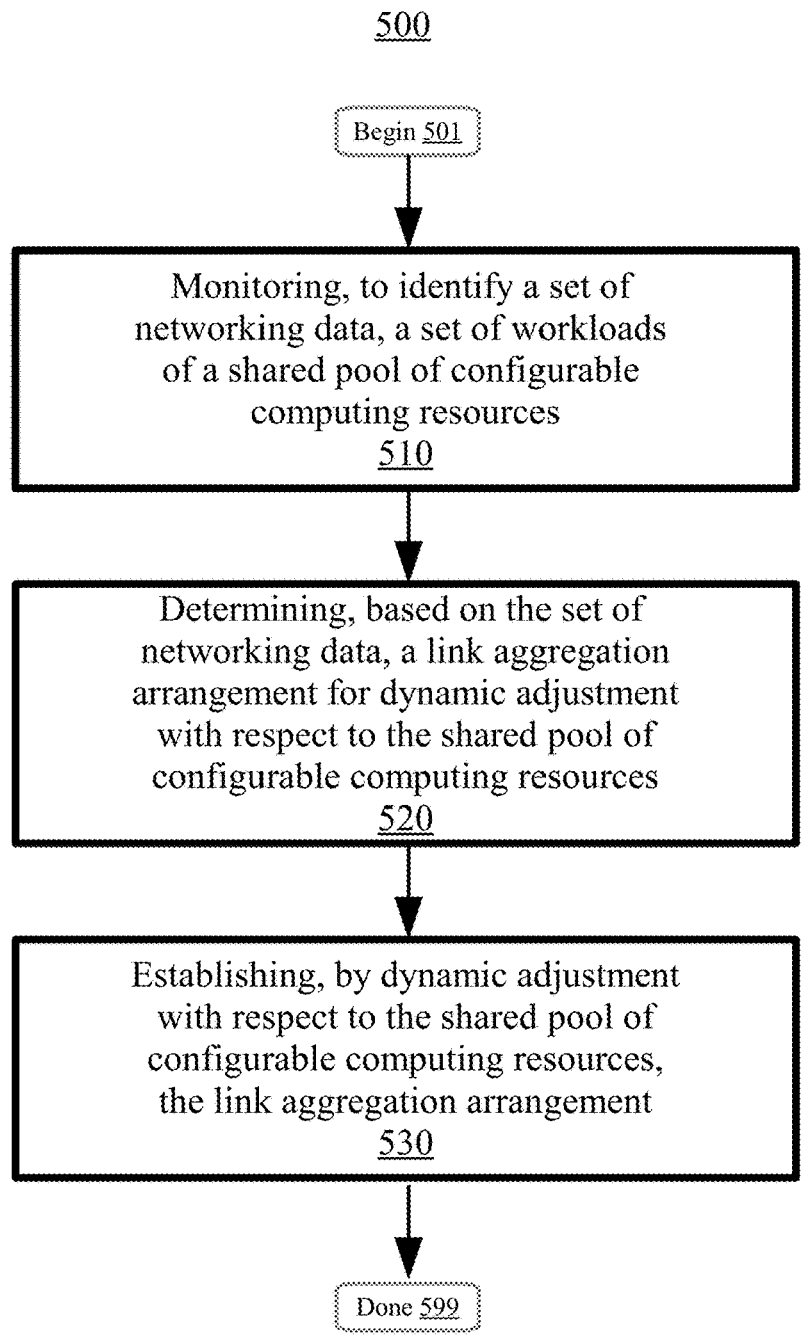
FIG. 5 is a flowchart illustrating a method of managing link aggregation with respect to a shared pool of configurable computing resources, according to embodiments.

FIG. 5 is a flowchart illustrating a method 500 of managing link aggregation with respect to a shared pool of configurable computing resources, according to embodiments. As described herein, the process of combining (e.g., aggregating) multiple network connections in parallel in order to increase network throughput may be termed link aggregation. A LAG (Link Aggregation Group) combines a number of physical ports together to make a single-high-bandwidth data path so as to implement the traffic load sharing among the member ports in the group and to enhance the connection reliability. Aspects of the present disclosure relate to dynamically managing a link aggregation arrangement (e.g., the configuration of network resources related to a LAG) without manual intervention from a user or network administrator. Management of a link aggregation arrangement can include both the aggregation of multiple connections into a single data path as well as the division of an aggregated connection into its constituent connections.

In embodiments, considerations for configuration of the link aggregation arrangement may include the physical components that make up the network, available/anticipated resource usage, and workload characteristics. Illustrative link aggregation initiatives can include configuring the network infrastructure based on the (unique) needs of a particular workload, or a balanced configuration based on a number of frequently processed workloads (e.g., for performance benefits). The method, system, and computer program product features described herein are not limited to the specifically described embodiments, but instead any combination of the disclosed features and elements is contemplated. Method 500 may begin at block 501.

At block 510, a set of workloads (e.g., of a shared pool of configurable computing resources) is monitored. Generally, monitoring the set of workloads may include scanning, surveying, tracking, recording, or otherwise observing network activity of the set of workloads. In embodiments, monitoring of the set of workloads can be performed using one or more network analysis tools or other diagnostic programs. As an example, a third party diagnostic tool may be used to track the network packets that are being transmitted to and from the network components of the cloud computing environment. In embodiments, portions of the set of networking data (e.g., type of workload, physical resource allocations, network configuration) may be monitored and collected while the workloads are inactive (e.g., not running), while some portions of the set of networking data (e.g., input/output activity, bandwidth usage) may be collected while the workloads are active (e.g., running).

The set of workloads may include one or more application programs, tasks, jobs, virtual machines, software threads, or other operations configured to be performed, executed, or carried-out by a compute node. The set of workloads can include a selection from a group consisting of at least one of: a set of web servers, a set of database servers, a set of LAMP stacks, a set of Redis (trademark of Salvatore Sanfilippo) servers, a set of Java-type servers, or a set of backup servers. For example, the workloads may include Apache (trademark of The Apache Software Foundation) web servers, DB2 database servers, Acronis (registered trademark of Acronis International GmbH and or its affiliates in the United States and other countries) backup servers, or the like. In embodiments, characteristics of the workloads may change over time based on evolving network requirements and infrastructure configurations (e.g., workloads may be added, subtracted, or modified based on cloud user preferences). As an example, a workload that includes a virtual machine that was previously configured to perform transaction processing (e.g., business processes such as billing and order processing) may be reconfigured to perform analytic operations (e.g., computational analysis of market trends based on historical sales data). In such a scenario, the network requirements and resources used by the workload before and after its reconfiguration may change. Accordingly, aspects of the disclosure relate to dynamically configuring the network infrastructure to facilitate the operations of the workloads.

A set of networking data can be identified (e.g., related to features/characteristics of the set of workloads, by monitoring the set of workloads). The identifying (e.g., ascertaining, computing) may be part of or separate from the monitoring (e.g., same module or different module). The networking data may include information regarding the type of workload (e.g., backup server, web server), network utilization data which indicates network activities, (e.g., bandwidth requirements, input/output traffic, types of data packets) nature of incoming and outgoing network traffic, hardware resource utilization, network configuration data, or the like. As examples, hardware resource utilization may indicate a degree of usage of one or more physical computing components (e.g., 2.97 GHz of available central processing unit resources, 4.5 megabytes of available memory), network bandwidth usage may indicate the relative amount of bandwidth used by each workload (e.g., Workload A is using 26% of available network bandwidth, Workload B is using 41%), or the like. In embodiments, the networking data may include a set of service-level agreement data which indicates a user-specification. The set of service agreement data may include a service contract agreement including parameters agreed to by both the cloud service provider and the end user. The user-specification may include a stipulation or parameter requested by the end user with respect to the cloud service (e.g., minimum/desired/maximum parameter values). For instance, the user specification may include a requested amount of bandwidth, physical hardware resources, network analysis or diagnostic tools, or the like. Other types of networking data beyond those explicitly disclosed herein are also possible.

At block 520, a link aggregation arrangement for dynamic adjustment with respect to the shared pool of configurable computing resources is determined based on the set of networking data. The link aggregation arrangement may include a configuration of a set of network interface controllers (NICs) or a configuration of a set of network switches. Generally, the link aggregation arrangement may refer to a specific grouping of one or more network connections combined in parallel in order to increase throughput beyond what a single network connection could sustain. Put differently, the link aggregation arrangement may include a number of designated network connections grouped together to create a single high-bandwidth data path. As described herein, the link aggregation arrangement can relate to both the aggregation of multiple connections into a single data path as well as the division of a single (aggregated) connection into a plurality of individual connections (and various resulting combinations thereof). In embodiments, various arrangements may be associated with performance or efficiency benefits including improved connection reliability, redundancy, and traffic load sharing.

In embodiments, determining the link aggregation arrangement may include analyzing the networking data. Such analysis may evaluate the extent to (or manner by) which the network requirements (e.g., input/output bandwidth requests/demands) of the set of workloads are achieved by the current network configuration. Based on an analysis of the networking data and the current network configuration, the method 500 may include ascertaining a link aggregation arrangement configured to facilitate achievement of the network requests/demands of the set of workloads (e.g., computing a new link aggregation arrangement which reduces a physical bandwidth factor). Similar to other aspects described herein, such operations can occur in an automated fashion without user intervention.

Consider the following example. In response to monitoring the networking data and evaluating the network configuration of a first virtual machine operating on a compute node, the network diagnostics may indicate that a particular workload configured to handle backup operations is running without network interface card redundancy (e.g., resulting in a risk of traffic failure in the event of connectivity loss). Establishment of a link aggregation arrangement may be associated with benefits such as data security and improved transfer speed. Accordingly, in embodiments, determining the link aggregation arrangement may include identifying two (or more) physical ports on the compute node as well as respective ports on the network switch that may be configured to redundant LAG mode. Such a configuration may ensure NIC redundancy in case of connectivity loss (e.g., by shifting traffic from a first port to a second port if the first port were to fail or otherwise be limited), as well as potential bandwidth increases. Other methods of determining the link aggregation arrangement are also possible.

In embodiments, aspects of determining the link aggregation arrangement relate to dividing an existing aggregated link aggregation arrangement into a plurality of separate connections. Accordingly, dividing the existing link aggregation arrangement into the plurality of separate connections may include identifying the network components (e.g., physical ports of the compute nodes, network switches, DNS servers) involved in the link aggregation arrangement and configuring them to decreased/non-LAG mode (e.g., fewer aggregations, no aggregation). As an example, consider a scenario in which a compute node originally configured to host a single high-volume workload using a link aggregation arrangement is reconfigured to host three database backups for three different client enterprises. In such an environment, changing the link aggregation arrangement (e.g., decreasing/disabling link aggregation) in order to isolate the network traffic of each workload may be associated with improved data security and performance.

At block 530, the link aggregation arrangement is established by dynamic adjustment with respect to the shared pool of configurable computing resources. Establishing the link aggregation arrangement may be performed in one or more ways based on the network infrastructure, available hardware resources, and workloads deployed on servers within the network. As examples, establishing the link aggregation arrangement may include creating, instantiating, forming, instituting, classifying, grouping, installing, or otherwise configuring the link aggregation arrangement. For instance, in embodiments, establishing the link aggregation arrangement may include identifying a plurality of physical hardware ports on one or more compute nodes of the network, as well as a plurality of respective ports on a network switch. The identified ports may be configured to link aggregation mode. Establishing the link aggregation arrangement may include dynamically updating a set of domain name system (e.g., DNS) servers to include the internet protocol (IP) addresses of the virtual machines involved in the link aggregation arrangement. Other methods of establishing the link aggregation arrangement are also possible.

In embodiments, the link aggregation arrangement can be established by dynamic adjustment (e.g., modifying when at least one workload is running or being executed). Generally, dynamic adjustment can relate to an active/ongoing/real-time modification of the network configuration based on the networking data (e.g., the current network environment indicates potential benefits to be gained by formation of a link aggregation group). In various embodiments, the dynamic adjustment may be performed, when the set of workloads is running, in real-time in response to analysis/evaluation of the networking data (e.g., which indicates ripeness as described herein).

Consider the following example. In embodiments, the cloud computing system of a public cloud provider may include a compute node having three physical NICs. The cloud computing system may originally be configured to host twelve unique HTTP servers for three different client companies. Each of the three companies may utilize a single physical NIC configured to run one or more virtual NICs (e.g., thereby providing physical network isolation). In embodiments, the compute node hosting the clients' workloads may be temporarily removed from the network for periodic maintenance, and the hosted clients' workloads may be migrated to another compute node in the network. At a later point in time, the original compute node may be added back to the network with no hosted virtual machines. In embodiments, the compute node may be selected to host a new workload including a backup server. However, as the NICs of the compute node are still configured according to the network requirements of the previous clients' workloads, aspects of the disclosure relate to the recognition that the current NIC configuration may not be conducive to the network requirements of the new client workload. Accordingly, aspects of the disclosure relate to identifying the nature of the new client workload (e.g., backup server) and determining a network configuration (e.g., a new link aggregation arrangement) to facilitate the operation of the new workload. In embodiments, it may be determined that the new link aggregation arrangement may provide performance and efficiency benefits for the new workload.

As described herein, aspects of the disclosure relate to establishing a link aggregation arrangement for the compute node by updating the NIC ports, network switch ports, and DNS server entries to promote backup operations. Over time, as the network utilization of the compute node and workload is monitored, it may be determined that the link aggregation port of two NICs is becoming fully utilized due to high volume backup operations. Accordingly, aspects of the disclosure relate to adding a third unused port of the NIC to the LAG group to provide more available bandwidth capacity. Other methods of determining and establishing the link aggregation arrangement (whether to combine operations of multiple ports into a new link aggregation arrangement or to siphon-off portions an existing link aggregation arrangement into at least one other port) are also possible. Method 500 may conclude at block 599.

Figure 6:
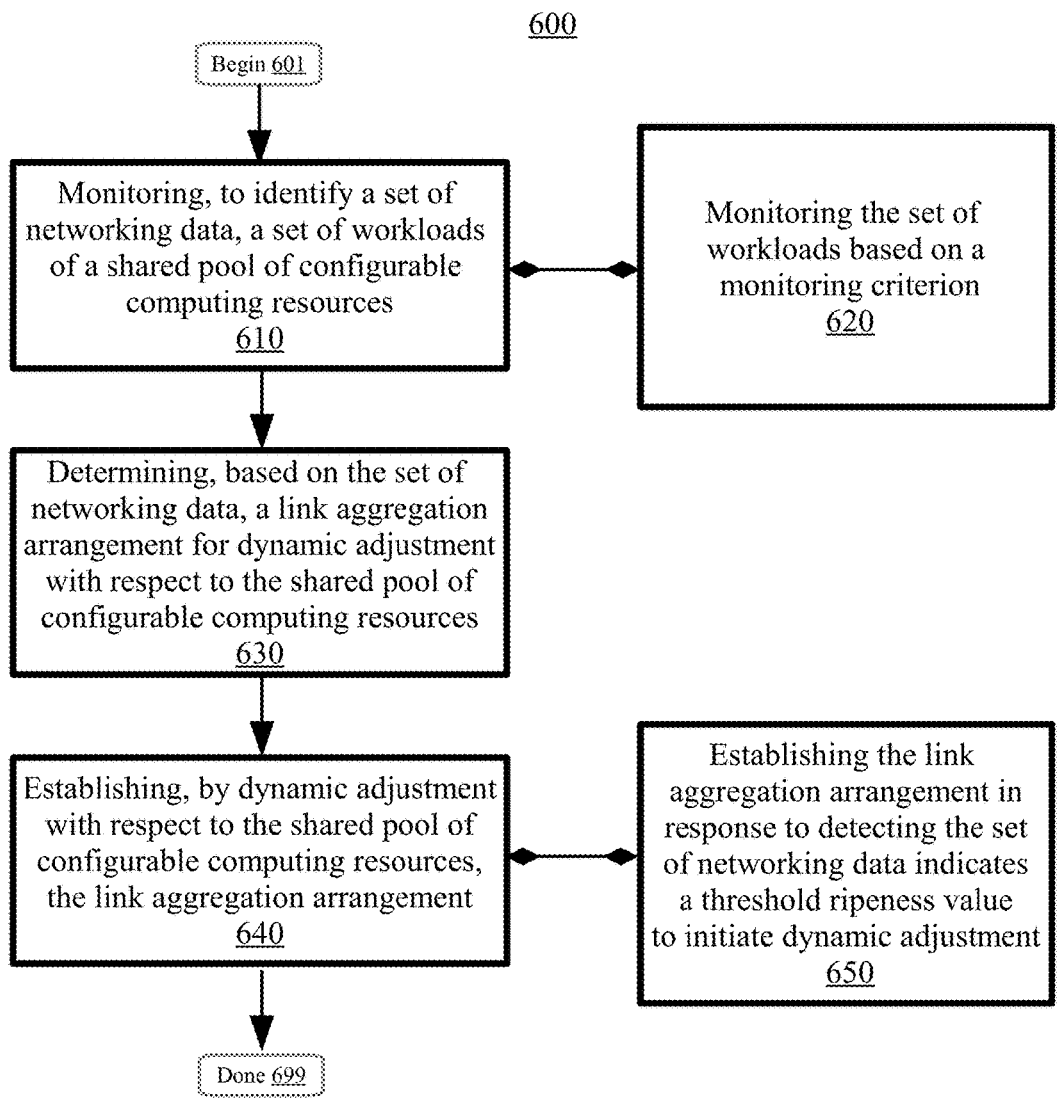
FIG. 6 is a flowchart illustrating a method of managing link aggregation with respect to a shared pool of configurable computing resources, according to embodiments.

FIG. 6 is a flowchart illustrating a method 600 for managing link aggregation with respect to a shared pool of configurable computing resources, according to embodiments. Aspects of the method 600 relate to monitoring the set of workloads based on a monitoring criterion, and establishing the link aggregation arrangement in response to detecting that the set of networking data indicates a threshold ripeness value to initiate dynamic adjustment. As shown in FIG. 6, the method 600 may include a first monitoring block 610, a second monitoring block 620, a determining block 630, a first establishing block 640, and a second establishing block 650. Other steps beyond those described explicitly herein are also possible. The method, system, and computer program product features described herein are not limited to the specifically described embodiments, but instead any combination of the disclosed features and elements is contemplated. Method 600 may begin at block 601.

As FIG. 6 illustrates, the method 600 may begin with a first monitoring block 610. In embodiments, the first monitoring block 610 may substantially correspond to monitoring block 510 of FIG. 5 or other embodiments described herein. Accordingly, monitoring block 610 may be configured to identify a set of networking data by monitoring a set of workloads. For instance, monitoring the set of workloads may include scanning, surveying, tracking, recording, or otherwise observing network activity of the set of workloads. Other methods and techniques for monitoring the set of workloads are also possible.

At block 620, the set of workloads may be monitored based on a monitoring criterion. Generally, the monitoring criterion may include one or more of a temporal period, a threshold physical bandwidth factor, or a resource capacity change with respect to the shared pool of configurable computing resources. As an example, monitoring the set of workloads may be performed at periodic time intervals (e.g., one day, one week, one month). In embodiments, the periodic time interval may be automatically ascertained based on historical network data (e.g., historical network update frequency, archived network usage statistics). In embodiments, parameters defining the requested temporal period may be input or provided to the system by a user or network administrator.

As another example, monitoring may be initiated in response to determining that a threshold physical bandwidth factor (e.g., designated level of network traffic) has been achieved. In embodiments, monitoring of the set of workloads may be performed in response to detection of a resource capacity change of the shared pool of configurable computing resources. For instance, a change to the amount of accessible memory, processor bandwidth, or available storage space may prompt monitoring of the set of workloads. Additionally, combination of one or more monitoring criterion is also possible. For example, in response to detecting a change to the available physical resource capacity, a periodic monitoring schedule may be instituted. Other combinations of the monitoring criteria are also possible.

Determining block 630 and first establishing block 640 may substantially correspond to determining block 520 and establishing block 530 of FIG. 5, respectively, as well as other embodiments described herein. Accordingly, at determining block 630 the networking data may be analyzed to evaluate the extent to which the network requirements (e.g., input/output bandwidth demands) of the set of workloads are achieved by the current network configuration. Based on an analysis of the networking data and the current network configuration, the method 600 may include ascertaining a link aggregation arrangement configured to facilitate the network demands of the set of workloads. At the first establishing block 640 the method 600 may include establishing the link aggregation arrangement (e.g., the link aggregation arrangement determined at determining block 630). Establishing the link aggregation arrangement may include creating, instantiating, forming, instituting, classifying, grouping, installing, or otherwise configuring the link aggregation.

At block 650, the link aggregation arrangement may be established in response to detecting that the networking data indicates a threshold ripeness value to initiate dynamic adjustment. Generally, the threshold ripeness value may include one or more quantitative factors that indicate that one or more parameters for network reconfiguration (e.g., establishment of a link aggregation arrangement) have been achieved. In embodiments, the threshold ripeness value may include one or more of a network inefficiency, a hardware resource addition, or a workload alteration. The threshold ripeness value may be automatically determined based on network diagnostics and analysis. In embodiments, the threshold ripeness value maybe be based on parameters provided by a network administrator. The threshold ripeness value may represent one or more different factors based on the configuration of the network and the input of the network administrator.

As an example, in the case of a workload alteration, the amount of network traffic handled by the workload may change. Accordingly, in such a configuration, the threshold ripeness value may be expressed as an integer value (e.g., 0-100) that expresses the deviation in network traffic from the average amount of network traffic (e.g., wherein the integer value 50 represents average network traffic levels, integers lower than 50 represent network traffic levels below the average, and integers greater than 50 represent greater than average traffic levels). In response to the amount of network traffic increasing beyond the threshold ripeness value (e.g., 65), the method 600 may include establishing the link aggregation arrangement. Similarly, in the case of a hardware resource addition, the threshold ripeness value may indicate a physical resource threshold that, if achieved, enables the establishment of a link aggregation arrangement (e.g., installation of additional NICs, new network switch, or the like). In certain embodiments, the threshold ripeness value may include a network inefficiency. The network inefficiency may represent a configuration parameter or network setting that results in sub-optimal network performance. Accordingly, the threshold ripeness value may be expressed as a percentage value, wherein higher percentages indicate greater network efficiency and lower percentages indicate lesser network efficiency. In response to detecting that the network efficiency is lower than a threshold value (e.g., based on network diagnostics, monitored networking data), the method 600 may include establishing the link aggregation arrangement. Method 600 may conclude at block 699.

Figure 7:
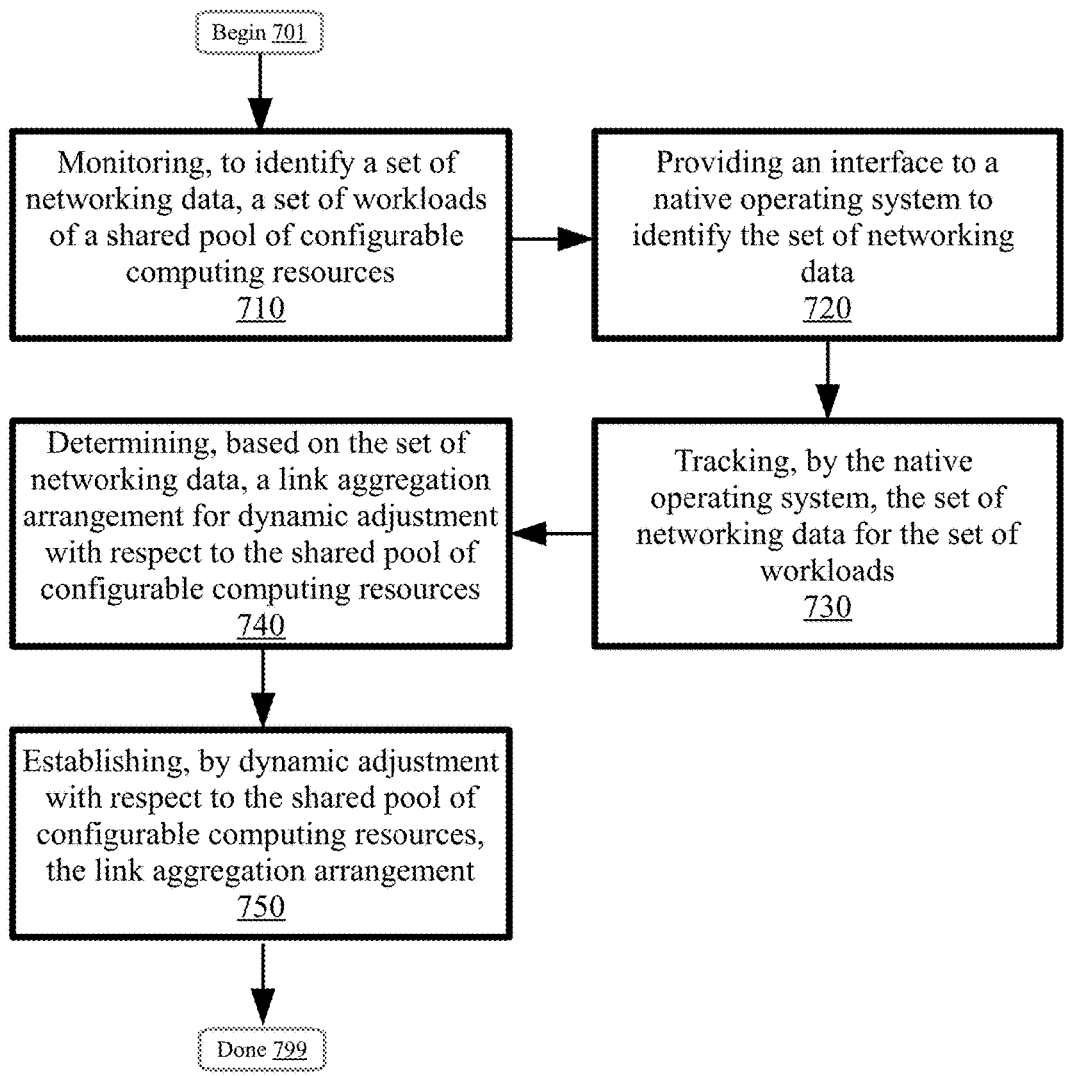
FIG. 7 is a flowchart illustrating a method of managing link aggregation with respect to a shared pool of configurable computing resources, according to embodiments.

FIG. 7 is a flowchart illustrating a method 700 for managing link aggregation with respect to a shared pool of configurable computing resources, according to embodiments. Aspects of the method 700 relate to monitoring a set of workloads to identify a set of networking data. More particular aspects of the method 700 relate to providing an interface to a native operating system to identify the set of networking data, and tracking the set of networking data by the native operating system. As shown in FIG. 7, the method 700 may include a monitoring block 710, a providing block 720, a tracking block 730, a determining block 740, and an establishing block 750. Other steps beyond those described explicitly herein are also possible. The method, system, and computer program product features described herein are not limited to the specifically described embodiments, but instead any combination of the disclosed features and elements is contemplated. Method 700 may begin at block 701.

As FIG. 7 illustrates, the method 700 may begin with monitoring block 710. In embodiments, the first monitoring block 710 may substantially correspond to monitoring block 510 of FIG. 5 as well as other embodiments described herein. Accordingly, monitoring block 710 may be configured to identify a set of networking data by monitoring a set of workloads. For instance, monitoring the set of workloads may include scanning, surveying, tracking, recording, or otherwise observing network activity of the set of workloads. Other methods and techniques for monitoring the set of workloads are also possible.

At block 720, an interface to a native operating system may be provided for identification of the set of networking data. Providing may include presenting, displaying, or otherwise preparing the interface for operation by a user. Generally, the interface may include a junction between a user and the native operating system that provides the user with a set of commands and menus through which the user may relay commands to the hardware and software components of the compute node. In embodiments, the interface may be configured to facilitate identification and management of the networking data. As described herein, the interface may be configured to provide access to a native operating system. The native operating system may include system software that manages both the physical hardware and software resources of a compute node and provides common services for computer programs. In embodiments, the native operating system may also enable management and configuration of other hardware and software components of the network. For instance, the interface and native operating system may provide tools that allow a network administrator to view the type and amount of network traffic handled by particular compute nodes, change in network activity over time or based on workload type, or a variety of other features to facilitate management of the networking data.

At block 730, the set of networking data may be tracked using the native operating system. Generally, tracking the set of networking data may include recording, scanning, surveying, observing, or otherwise monitoring the set of networking data. In embodiments, the interface may be configured to provide tracking tools to further facilitate observation of the networking data. As an example, the interface may enable network administrators to isolate and monitor particular types of network traffic (e.g., based on packet type, destination, sender). Further, the native operating system may be configured to maintain a networking data traffic log that records information (e.g., type, amount, destination, error messages) regarding the networking data handled by the compute nodes. In embodiments, the interface may allow users to specify triggers, such that a network administrator is alerted when particular thresholds are met (e.g., traffic of a particular type achieves a threshold level within a specified time period). Other methods of tracking the networking data by the native operating system are also possible.

As described herein, at block 740 a link aggregation arrangement may be determined based on the networking data. At block 750, the link aggregation arrangement may be established by dynamic adjustment with respect to the shared pool of configurable computing resources. Aspects of method 700 may be associated with improved network load-balancing, data redundancy, network speed, and performance. Method 700 may conclude at block 799.

Figure 8:
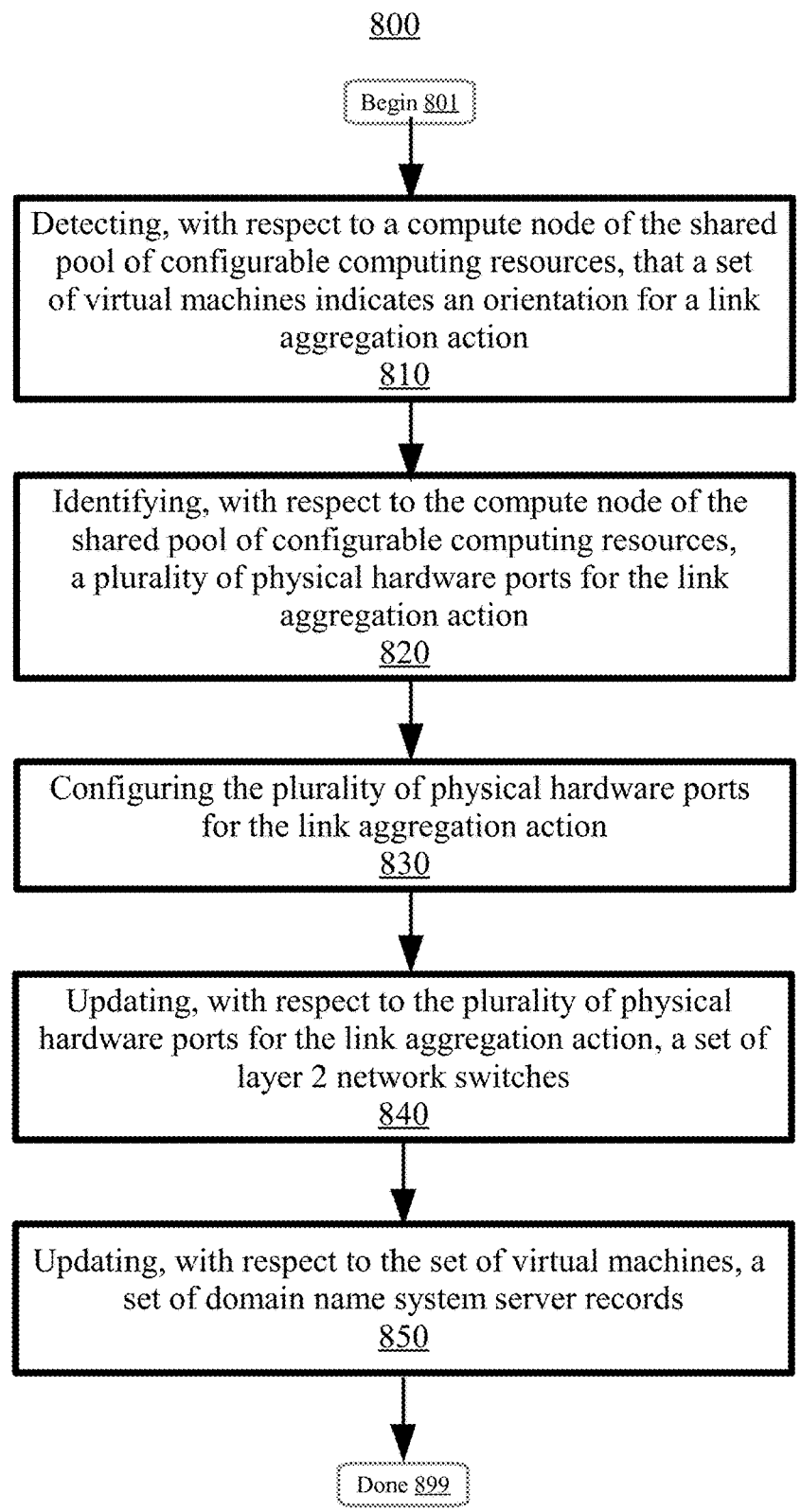
FIG. 8 is a flowchart illustrating a method of managing link aggregation with respect to a shared pool of configurable computing resources, according to embodiments.

FIG. 8 is a flowchart illustrating a method 800 for managing link aggregation with respect to a shared pool of configurable computing resources, according to embodiments. Aspects of the method 800 relate to configuring network hardware to establish a link aggregation arrangement in response to detecting an orientation for a link aggregation action. More particularly, aspects of the method 800 relate to detecting an orientation for a link aggregation action, identifying a plurality of physical hardware ports for the link aggregation action, configuring the plurality of hardware ports, updating a set of network switches, and updating a set of domain name system server records. As shown in FIG. 8, the method 800 may include a detecting block 810, an identifying block 820, a configuring block 830, a first updating block 840, and a second updating block 850. Other steps beyond those described explicitly herein are also possible. The method, system, and computer program product features described herein are not limited to the specifically described embodiments, but instead any combination of the disclosed features and elements is contemplated. Method 800 may begin at block 801.

At block 810, an orientation for a link aggregation action may be detected. The orientation for the link aggregation action may be indicated by a set of virtual machines. In embodiments, the virtual machines may be part of a set of workloads running on a set of compute nodes (e.g., compute node 430 and compute node 450 of FIG. 4, as well as other described embodiments). Generally, the orientation for the link aggregation action may include a trigger, requisite parameter, or other factor that indicates a favorable configuration for establishment of a link aggregation arrangement. As examples, the orientation for the link aggregation action may include a NIC redundancy request for the set of virtual machines, a migration of the set of virtual machines from a particular compute node, a deletion of the set of virtual machines from the compute node, a resize of the set of virtual machines on the compute node, or a deployment of the set of virtual machines to the compute node.

In embodiments, detecting the orientation for the link aggregation action may include receiving a request or notification of a modification with respect to the virtual machines (e.g., migration of the set of virtual machines to or from the compute node), or automatic determination based on analysis of the set of virtual machines (e.g., monitoring the set of workloads and evaluating the networking data). As an example, detecting the orientation for the link aggregation may include detecting a reconfiguration of one or more workloads hosted on a compute node. For instance, one or more workloads previously configured to perform batch processing may be reconfigured to maintain a database server. As an additional example, in certain embodiments detecting the orientation for the link aggregation action may include receiving a notification that a new set of virtual machines is set to be deployed on a particular compute node. Accordingly, the compute node may identify the incoming virtual machines and evaluate them to determine compatibility with a link aggregation arrangement. Other methods of detecting the orientation for the link aggregation action are also possible.

At block 820, a plurality of physical hardware ports for the link aggregation action may be identified. Generally, the physical hardware ports may include interfaces that enable communication between the compute node and other hardware and peripheral devices. More specifically, in certain embodiments, the physical hardware ports may include ports for interfacing with the network functionality of the compute node (e.g., NICs 440, 445, 450, 455 of FIG. 4). As examples, the physical hardware ports may include Ethernet ports, USB ports, serial/parallel ports, or other type of port that enables communication between the networking components of the compute node and other devices. Accordingly, identifying the plurality of physical hardware ports may include recognizing the number and type of hardware ports available on the compute nodes available in the local network. In embodiments, identifying the hardware ports may be configured to make use of a device manager application or other tool to track the hardware features of the compute nodes. Other methods of identifying the plurality of physical hardware ports are also possible.

At block 830, the plurality of physical hardware ports may be configured for the link aggregation action. As described herein, configuring the plurality of physical hardware ports may include enabling link aggregation mode on each physical hardware port determined to be included in the link aggregation arrangement. More particularly, configuring the plurality of physical hardware ports to link aggregation mode may include assigning ports to the link aggregation by issuing an instruction or command from the compute node (e.g., compute node 430 of FIG. 4) to the NIC (e.g., NIC 440) instructing the NIC to enable link aggregation mode for the appropriate physical hardware ports. As an example, in certain embodiments, assigning ports to the link aggregation may first include specifying the ports that belong to a particular trunk group. This may include specifying the interface and the ports that belong to the first trunk (e.g., SFS-3504 (config)# interface ethernet 1/1-1/6), entering the trunk group ID or the name of the new trunk (e.g. SFS-3504 (config-if-ether-1/1-1/6)# trunk-group 1), and returning to global configuration mode (e.g., SFS-3504 (config-if-ether-1/1-1/6)# exit). Other methods of configuring the plurality of physical hardware ports for the link aggregation action are also possible.

At block 840, a set of layer 2 network switches may be updated with respect to the plurality of physical hardware ports for the link aggregation action. As described herein, the layer 2 network switches may include switching hubs, network bridges, MAC bridges, or other networking devices that make use of packet switches to receive, process, forward, and route data to destination network devices (e.g., illustrated by switches 465, 470, and 475 of FIG. 4). Updating the set of layer 2 network switches may include configuring the network switches to enable link aggregation mode for at least the ports communicatively connected to the respective physical hardware ports of the compute node. Accordingly, the network switch may then be configured to receive, process, and route traffic to and from the NIC of the compute node in accordance with the determined link aggregation arrangement.

At block 850, a set of domain name system (e.g., DNS) server records may be updated. As described herein, updating the set of domain name system server records may include revising the DNS records of one or more DNS servers to accurately refer to the IP addresses of the NICs included in the link aggregation arrangement. For instance, in certain embodiments, the DNS zone files of the DNS servers communicatively connected to the compute nodes may be edited to facilitate resolving of specific internet domain names to appropriate IP addresses. Other methods of updating the set of layer 2 network switches and the DNS server records are also possible. Method 800 may conclude at block 899.

Figure 9:
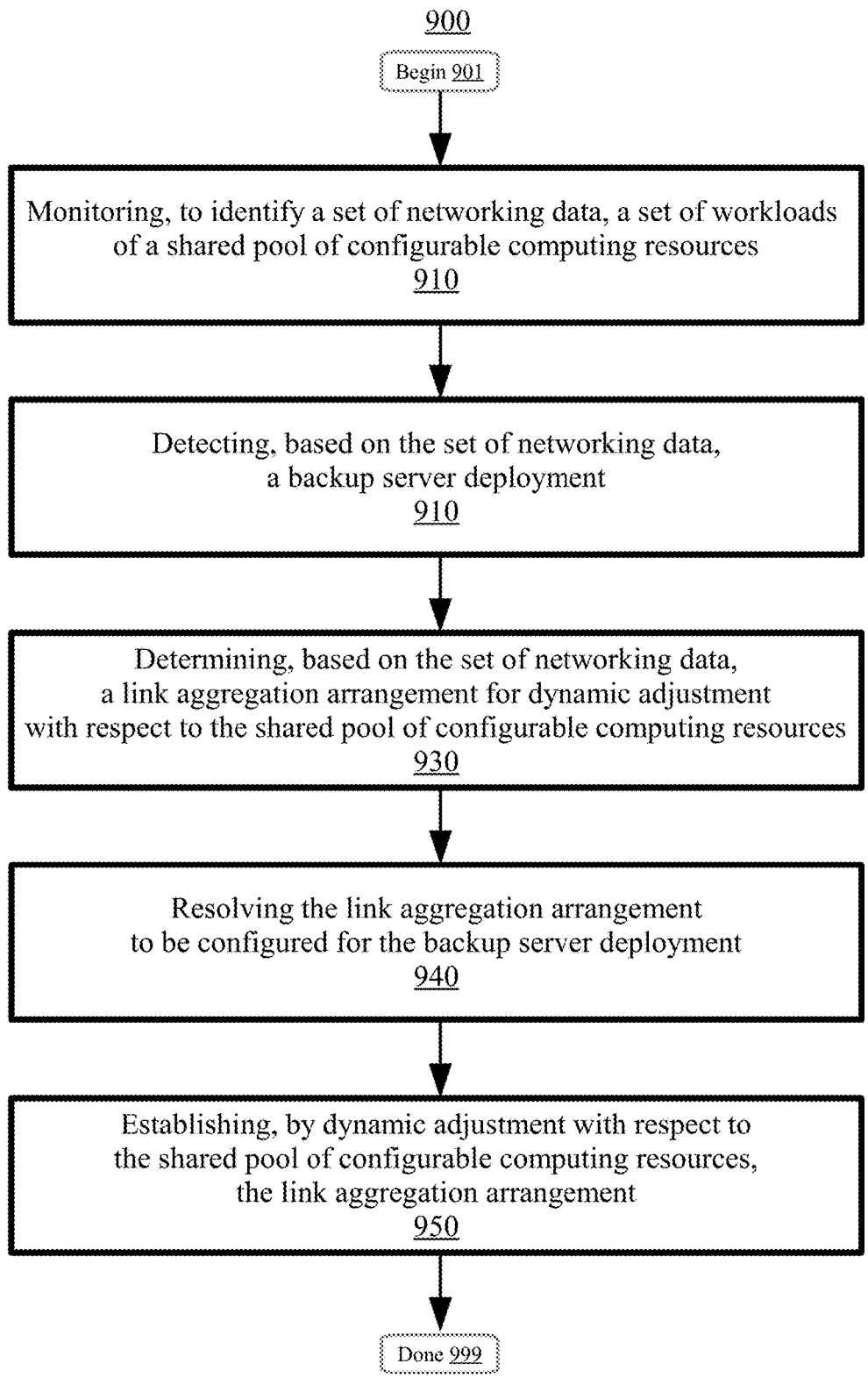
FIG. 9 is a flowchart illustrating a method of managing link aggregation with respect to a shared pool of configurable computing resources, according to embodiments.

FIG. 9 is a flowchart illustrating a method 900 for managing link aggregation with respect to a shared pool of configurable computing resources, according to embodiments. Aspects of the method 900 relate to configuring network hardware to establish a link aggregation arrangement in response to detecting an orientation for a link aggregation action. More particularly, aspects of the method 900 relate to detecting a backup server deployment based on the set of networking data, and resolving the link aggregation arrangement to be configured for the backup server deployment. As shown in FIG. 9, the method 900 may include a monitoring block 910, a detecting block 920, a determining block 930, a resolving block 940 and an establishing block 950. Other steps beyond those described explicitly herein are also possible. The method, system, and computer program product features described herein are not limited to the specifically described embodiments, but instead any combination of the disclosed features and elements is contemplated. Method 900 may begin at block 901.

As FIG. 9 illustrates, the method 900 may begin with a monitoring block 910. In embodiments, the monitoring block 910 may substantially correspond to monitoring block 510 of FIG. 5 or other embodiments described herein. Accordingly, monitoring block 910 may be configured to identify a set of networking data by monitoring a set of workloads. For instance, monitoring the set of workloads may include scanning, surveying, tracking, recording, or otherwise observing network activity of the set of workloads. Other methods and techniques for monitoring the set of workloads are also possible.

At block 920, a backup server deployment may be detected based on the set of networking data. As described herein, detecting the backup server deployment may include recognizing, identifying, or otherwise discovering the backup server deployment in response to analyzing the set of networking data identified at block 910. As an example, in embodiments, detecting the backup server deployment may include analyzing the set of networking data and determining that a portion of the network traffic contains an increased amount of redundant packets (e.g., indicative of a backup server). As another example, detecting the backup server deployment may include detecting a change to the network configuration. For instance, additional hardware (e.g., storage devices) may be added to the local network to facilitate operation of the backup server deployment. Similarly, in certain embodiments, detecting the backup server deployment may include identifying the installation of new software (e.g., backup software) on a compute node of the network. Other methods of detecting the backup server deployment beyond those described explicitly herein are also possible.

At block 930, a link aggregation arrangement for dynamic adjustment may be determined based on the set of networking data. As described herein, determining the link aggregation arrangement may include analyzing the networking data to evaluate the degree to which the network requirements (e.g., input/output bandwidth demands) of the set of workloads are achieved by the current network configuration. Based on an analysis of the networking data and the current network configuration, the method 900 may include ascertaining a link aggregation arrangement configured to facilitate the network demands of the set of workloads. In embodiments, determining block 930 may substantially correspond with determining block 630 of FIG. 6.

At block 940, the link aggregation arrangement may be resolved for the backup server deployment. Generally, resolving the link arrangement to be configured for the backup server deployment may include ascertaining, identifying, selecting, or otherwise determining the link aggregation arrangement to facilitate the backup server deployment. In embodiments, resolving the link aggregation arrangement may be performed in response to detecting the backup server deployment. For instance, consider the following example. In response to detecting the backup server deployment, the resolving block 940 may be configured to identify the compute nodes, NICs, network switches, and other network components that will be involved in the backup server deployment, and configuring them based on the network requirements of the backup server deployment. For instance, the network may be configured to support data redundancy and load balancing of network traffic to create a network environment conductive to the backup server deployment. Other methods of resolving the link aggregation arrangement are also possible.

Figure 10:
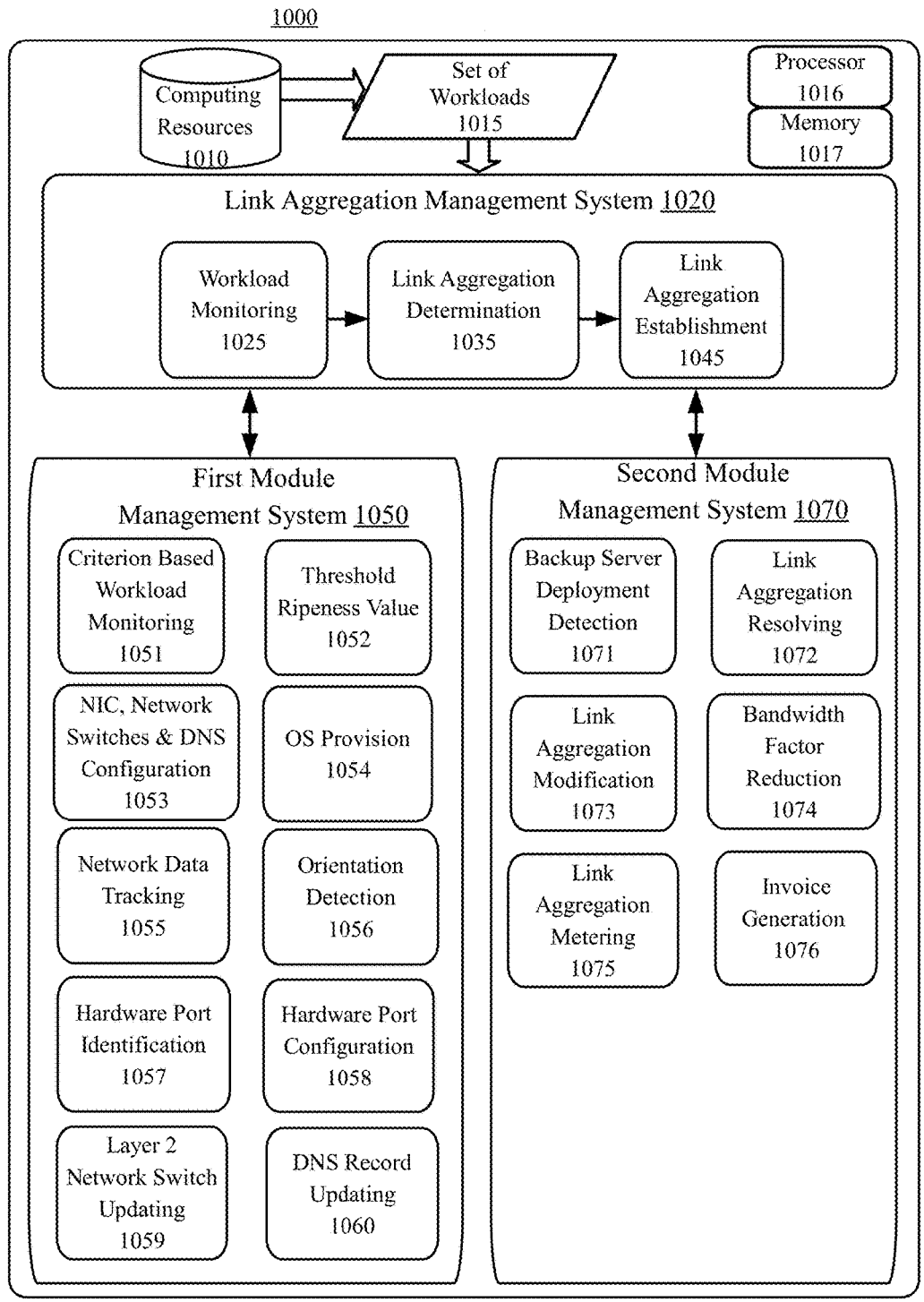
FIG. 10 depicts an example system architecture for implementing a method for managing link aggregation with respect to a shared pool of configurable computing resources, according to embodiments.

As described herein, at block 950 the link aggregation arrangement may be established by dynamic adjustment with respect to the shared pool of configurable computing resources. Aspects of method 900 may be associated with improved network load-balancing, data redundancy, network speed, and performance. Method 900 may conclude at block 999. FIG. 10 depicts an example system architecture 1000 for implementing a method for managing link aggregation with respect to a shared pool of configurable computing resources, according to embodiments. Aspects of the system architecture 1000 relate to dynamically managing a link aggregation arrangement (e.g., the configuration of network resources such as physical hardware ports, network switches, DNS server settings, and compute node settings included in a LAG) without manual intervention from a user or network administrator. The system 1000 may include computing resources 1010, a central processing unit (CPU) 1016, memory 1017, a set of workloads 1015, a link aggregation management system 1020, a workload monitoring module 1025, a link aggregation determination module 1035, a link aggregation establishment module 1045, a first module management system 1050, a second module management system 1070 and a number of modules, submodules, and other operations configured to facilitate aspects of link aggregation management. The method, system, and computer program product features described herein are not limited to the specifically described embodiments, but instead any combination of the disclosed features and elements is contemplated.

Aspects of the example system architecture 1000 relate to managing a link aggregation arrangement. As shown in FIG. 10, the example system architecture 1000 may include computing resources 1010. The computing resources may include the physical hardware resources (e.g., storage space, memory, processor capacity) as well as the network resources (e.g., bandwidth, data, information, and other shared resources) available to the network. The computing resources 1010 may be utilized by the set of workloads 1015 to perform a variety of tasks and operations based on the nature and type of the set of workloads 1015. As described herein, the set of workloads 1015 may include one or more of a set of web servers, a set of database servers, a set of backup servers or the like. The example system architecture 1000 may also include a CPU 1016 and memory 1017 configured to implement various aspects disclosed herein.

As described herein, in embodiments the link aggregation management system 1020 relates to managing a link aggregation arrangement to facilitate the operation of the set of workloads 1015. As FIG. 10 illustrates, the link aggregation management system 1020 may include a workload monitoring module 1025, a link aggregation determination module 1035, a link aggregation establishment module 1045. The workload monitoring module 1025, the link aggregation determination module 1035, and the link aggregation establishment module 1045 may substantially correspond to the monitoring block 510, determining block 520, and establishing block 530 of FIG. 5, respectively, as well as other embodiments described herein.

At workload monitoring module 1025, aspects of the disclosure may be relate to monitoring the set of workloads to identify the set of networking data. Monitoring the set of workloads to identify the set of networking data may include scanning, surveying, tracking, recording, or otherwise observing network activity of the set of workloads. In embodiments, the monitoring may be performed using one or more network analysis tools or other diagnostic programs. Based on the set of networking data identified at workload monitoring module 1025, the link aggregation determination module 1035 may be configured to determine a link aggregation arrangement. Determining the link aggregation arrangement may include analyzing the networking data to evaluate the degree to which the network requirements (e.g., input/output bandwidth demands) of the set of workloads are achieved by the current network configuration. Based on an analysis of the networking data and the current network configuration, the method 500 may include ascertaining a link aggregation arrangement configured to facilitate the network demands of the set of workloads.

Accordingly, at link aggregation establishment module 1045, the link aggregation system 1020 may be configured to establish the link aggregation by dynamic adjustment with respect to the shared pool of configurable computing resources. Establishing the link aggregation arrangement may include creating, instantiating, forming, instituting, classifying, grouping, installing, or otherwise configuring the link aggregation. As an example, in certain embodiments, establishing the link aggregation arrangement may include identifying a plurality of physical hardware ports on one or more compute nodes of the network, as well as a plurality of respective ports on a network switch. The identified ports may be configured to link aggregation mode. Further, a set of domain name system (e.g., DNS) servers may be dynamically updated to include the IP addresses of the virtual machines involved in the link aggregation arrangement. Other methods of establishing the link aggregation arrangement are also possible.

As described herein, aspects of the disclosure relate to monitoring the set of workloads 1015. At block 1051, the first module management system 1050 may be configured to monitor the set of workloads 1015 based on a monitoring criterion. Generally, the monitoring criterion may include one or more of a temporal period, a threshold physical bandwidth factor, or a resource capacity change with respect to the shared pool of configurable computing resources. As an example, monitoring the set of workloads may be performed at periodic time intervals (e.g., one day, one week, one month). The desired temporal period may be designated by a user or network administrator. As another example, monitoring may be initiated in response to determining that a threshold physical bandwidth factor (e.g., designated level of network traffic) has been achieved.

At threshold ripeness value module 1052, the first module management system 1050 may be configured to in response to detecting that the networking data indicates a threshold ripeness value to initiate dynamic adjustment. Generally, the threshold ripeness value may include one or more quantitative factors that indicate that one or more parameters for network reconfiguration (e.g., establishment of a link aggregation arrangement) have been achieved. In embodiments, the threshold ripeness value may include one or more of a network inefficiency, a hardware resource addition, or a workload alteration.

At NIC, Network Switches and DNS configuration module 1053, the first module management system 1050 may be configured to configure the NICs, network switches, and DNS servers of the network to facilitate the network requirements of the set of workloads 1015. Configuring the NICs, network switches, and DNS servers may include identifying the network components (e.g., NICs, network switches, and DNS servers) of the local network, and adapting or modifying them to support link aggregation mode. Other methods of configuring the NICs, network switches, DNS servers, and other network components are also possible.

At OS Provision module 1054, the first module management system may be configured to provide an interface to a native operating system to identify the set of networking data. The native operating system may include system software that manages both the physical hardware and software resources of a compute node and provides common services for computer programs. Generally, the interface may include a junction between a user and the native operating system that provides the user with a set of commands and menus through which the user may relay commands to the hardware and software components of the compute node. In embodiments, the interface may be configured to facilitate identification and management of the networking data. Accordingly, at network data tracking block 1055, the first module management system 1050 be configured to track the set of networking data using the native operating system. Tracking the set of networking data may include recording, scanning, surveying, observing, or otherwise monitoring the set of networking data. In embodiments, the interface may be configured to provide tracking tools to further facilitate observation of the networking data. As an example, the interface may enable network administrators to isolate and monitor particular types of network traffic (e.g., based on packet type, destination, sender).

At orientation detection module 1056, the first module management system 1050 may include detecting that the set of workloads 1015 indicates an orientation for a link aggregation action. Generally, the orientation for the link aggregation action may include a trigger, requisite parameter, or other factor that indicates a favorable configuration for establishment of a link aggregation arrangement. As an example, detecting the orientation for the link aggregation may include receiving a request or notification of a modification with respect to the virtual machines (e.g., migration of the set of virtual machines to or from the compute node), or automatic determination based on analysis of the set of virtual machines (e.g., monitoring the set of workloads and evaluating the networking data). Other methods of detecting the orientation for the link aggregation action are also possible.

At hardware port identification 1057, the first module management system 1050 may include identifying a plurality of physical hardware ports. The physical hardware ports may include interfaces that enable communication between the compute node and other hardware and peripheral devices. Identifying the plurality of physical hardware ports may include recognizing the number and type of hardware ports available on the compute nodes available in the local network. In embodiments, identifying the hardware ports may be configured to make use of a device manager application or other tool to track the hardware features of the compute nodes.

At hardware port configuration module 1058, the first module management system 1050 may include configuring the plurality of physical hardware ports for the link aggregation action. As described herein, configuring the plurality of physical hardware ports may include enabling link aggregation mode on each physical hardware port determined to be included in the link aggregation arrangement. More particularly, configuring the plurality of physical hardware ports to link aggregation mode may include assigning ports to the link aggregation by issuing an instruction or command from the compute node (e.g., compute node 430 of FIG. 4) to the NIC (e.g., NIC 440) instructing the NIC to enable link aggregation mode for the appropriate physical hardware ports.

At layer 2 network switch updating module 1059, the first module management system 1050 may include updating a set of layer 2 network switches with respect to the plurality of physical hardware ports for the link aggregation action. As described herein, the layer 2 network switches may include switching hubs, network bridges, MAC bridges, or other networking devices that make use of packet switches to receive, process, forward, and route data to destination network devices (e.g., illustrated by switches 465, 470, and 475 of FIG. 4). Updating the set of layer 2 network switches may include configuring the network switches to enable link aggregation mode for at least the ports communicatively connected to the respective physical hardware ports of the compute node. Similarly, at DNS record updating module 1060, the first module management system 1050 may include updating a set of domain name system (e.g., DNS) server records. As described herein, updating the set of domain name system server records may include revising the DNS records one or more DNS servers to accurately refer to the IP addresses of the NICs included in the link aggregation arrangement. Other methods of updating the set of layer 2 network switches and the DNS server records are also possible.

At backup server deployment detection module 1071, the second module management system 1070 may be configured to detect a backup server deployment. Detecting the backup server deployment may include recognizing, identifying, or otherwise discovering the backup server deployment in response to analyzing the set of networking data identified at block 910. As an example detecting the backup server deployment may include analyzing the set of networking data and determining that a portion of the network traffic contains an increased amount of redundant packets (e.g., indicative of a backup server). At link aggregation resolving module 1072, the second module management system 1070 may include resolving the link aggregation arrangement to be configured for the backup server deployment. Resolving the link arrangement to be configured for the backup server deployment may include establishing, instantiating, instituting, modifying, adapting, or otherwise creating the link aggregation to facilitate the backup server deployment. As an example, in response to detecting the backup server deployment, the second module management system 1070 may be configured to update the compute nodes, NICs, network switches, and other network components based on the network requirements of the backup server deployment. Other methods of resolving the link aggregation arrangement are also possible.

Aspects of the disclosure, in embodiments, relate to modifying the link aggregation arrangement in response to a change to the set of workloads. Accordingly, link aggregation arrangement modification module 1073 may be configured to modify the link aggregation arrangement. Generally, modifying the link aggregation arrangement may include adjusting, editing, reconfiguring, revising, or otherwise altering the configuration of the link aggregation arrangement to establish an environment suitable for the set of workloads 1015. As described herein, in embodiments the link aggregation arrangement may be modified in response to a change to the set of workloads. The change to the set of workloads may include a variation, alteration, modification, or other detected difference with respect to the set of workloads. For instance, consider the following example. A compute node may originally be configured to run a particular workload including two unique web servers in a link aggregation arrangement. A third web server may be deployed on the same compute node. Accordingly, as described herein, modifying the link aggregation arrangement may include revising the link aggregation arrangement to include the third web server. Other methods of modifying the link aggregation arrangement are also possible.

In certain embodiments, at bandwidth factor reduction module 1074, establishment of the link aggregation arrangement may be associated with a reduction in a physical bandwidth factor (e.g., decreased network stress/strain measured by a quantity of data transferred over the network in a given temporal period). As described herein, establishment of the link aggregation may provide benefits associated with load balancing. Accordingly, in certain embodiments, establishment of the link aggregation may allow for improved network traffic distribution (e.g., more even traffic flow) between the components of the network, and lead to a decrease in network congestion and overall bandwidth use. Other benefits beyond those described explicitly herein are also possible.

At link aggregation metering module 1075, the second module management system 1070 may be configured to metering use of the link aggregation arrangement. Metering use of the link aggregation arrangement may include tracking, documenting, recording, or calculating the degree of utilization of the link aggregation arrangement. The degree of utilization of the placement arrangement may be expressed in terms of time (e.g., 500 hours, 4 months, 2 years), resource usage (e.g., number of NICs or compute nodes involved in the link aggregation arrangement, bandwidth utilized by the link aggregation arrangement) or other means. Based on the metered use, the present disclosure may include generating an invoice. The invoice may include a bill, fee, service charge, or other itemized breakdown specifying compensation for the usage of the placement arrangement. Subscription based models are also possible.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing relates to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for use with a computing system including a compute host having a plurality of Ethernet ports, the method comprising:

for each given Ethernet port of the plurality of Ethernet ports, setting a link aggregation (LAG) setting, so that the computing system has a first LAG configuration;

monitoring applications running in the computing system to identify a first set of networking requirements, with the first set of networking requirements including information indicative of an optimal network utilization level such that the applications running in the computing system do not overload hardware of the computing system;

determining that the optimal network utilization level has been exceeded such that the applications running in the computing system have overloaded the hardware of the computing system; and responsive to the determination that the optimal network utilization level has been exceeded, adjusting LAG mode settings on at least some Ethernet ports of the plurality of Ethernet ports based, at least in part, upon the first set of networking requirements to configure the computing system in a second LAG configuration.

2. The method of claim 1 further comprising:

communicating data generated by the applications through the plurality of Ethernet ports in the second LAG configuration so that data is communicated through a plurality of aggregated links that: (i) are aggregated in the second LAG configuration, and (ii) were not aggregated in the first LAG configuration.

3. The method of claim 1 wherein the adjustment of LAG mode settings to configure the computing system in a second LAG configuration includes:

determining the extent to which the optimal network utilization level has been exceeded;

determining, by machine logic, a number of links to be aggregated based upon the extent to which the optimal network utilization level has been exceeded; and aggregating a plurality of N links on the Ethernet ports of the plurality of Ethernet ports, with N being equal to the number of links to be aggregated.

4. The method of claim 1 wherein the first LAG configuration includes a plurality of links, respectively corresponding to Ethernet ports, having a first degree of link aggregation; and the second LAG configuration includes the plurality of links having a second degree of link aggregation that is greater than the first degree of link aggregation.

5. The method of claim 4 wherein each Ethernet port includes a respectively corresponding network interface controller (NIC) port.

6. The method of claim 1 wherein the optimal network utilization level is based, at least in part, upon a workload being performed by the computing system.

7. A computer program product (CPP) for use with a computing system including a compute host having a plurality of Ethernet ports, the CPP comprising:
a machine readable storage device; and
computer code stored on the machine readable storage device, with the computer code including instructions and data for causing a processor(s) set to perform operations including the following:
for each given Ethernet port of the plurality of Ethernet ports, setting a link aggregation (LAG) setting, so that the computing system has a first LAG configuration,
monitoring applications running in the computing system to identify a first set of networking requirements, with the first set of networking requirements including information indicative of an optimal network utilization level such that the applications running in the computing system do not overload hardware of the computing system,
determining that the optimal network utilization level has been exceeded such that the applications running in the computing system have overloaded the hardware of the computing system, and
responsive to the determination that the optimal network utilization level has been exceeded, adjusting LAG mode settings on at least some Ethernet ports of the plurality of Ethernet ports based, at least in part, upon the first set of networking requirements to configure the computing system in a second LAG configuration.

8. The CPP of claim 7 wherein the computer code further includes instructions and data for causing the processor(s) set to perform the following operations:
communicating data generated by the applications through the plurality of Ethernet ports in the second LAG configuration so that data is communicated through a plurality of aggregated links that: (i) are aggregated in the second LAG configuration, and (ii) were not aggregated in the first LAG configuration.

9. The CPP of claim 7 wherein the adjustment of LAG mode settings to configure the computing system in a second LAG configuration includes:
determining the extent to which the optimal network utilization level has been exceeded;
determining, by machine logic, a number of links to be aggregated based upon the extent to which the optimal network utilization level has been exceeded; and
aggregating a plurality of N links on the Ethernet ports of the plurality of Ethernet ports, with N being equal to the number of links to be aggregated.

10. The CPP of claim 7 wherein:
the first LAG configuration includes a plurality of links, respectively corresponding to Ethernet ports, having a first degree of link aggregation; and
the second LAG configuration includes the plurality of links having a second degree of link aggregation that is greater than the first degree of link aggregation.

11. The CPP of claim 10 wherein each Ethernet port includes a respectively corresponding network interface controller (NIC) port.

12. The CPP of claim 7 wherein the optimal network utilization level is based, at least in part, upon a workload being performed by the computing system.

13. A computer system (CS) for use with a compute host having a plurality of Ethernet ports, the CS comprising:
a processor(s) set;
a machine readable storage device; and
computer code stored on the machine readable storage device, with the computer code including instructions and data for causing the processor(s) set to perform operations including the following:
for each given Ethernet port of the plurality of Ethernet ports, setting a link aggregation (LAG) setting, so that the computing system has a first LAG configuration,
monitoring applications running in the computing system to identify a first set of networking requirements, with the first set of networking requirements including information indicative of an optimal network utilization level such that the applications running in the computing system do not overload hardware of the computing system,
determining that the optimal network utilization level has been exceeded such that the applications running in the computing system have overloaded the hardware of the computing system, and
responsive to the determination that the optimal network utilization level has been exceeded, adjusting LAG mode settings on at least some Ethernet ports of the plurality of Ethernet ports based, at least in part, upon the first set of networking requirements to configure the computing system in a second LAG configuration.

14. The CS of claim 13 wherein the computer code further includes instructions and data for causing the processor(s) set to perform the following operations:
communicating data generated by the applications through the plurality of Ethernet ports in the second LAG configuration so that data is communicated through a plurality of aggregated links that: (i) are aggregated in the second LAG configuration, and (ii) were not aggregated in the first LAG configuration.

15. The CS of claim 13 wherein the adjustment of LAG mode settings to configure the computing system in a second LAG configuration includes:
determining the extent to which the optimal network utilization level has been exceeded;
determining, by machine logic, a number of links to be aggregated based upon the extent to which the optimal network utilization level has been exceeded; and
aggregating a plurality of N links on the Ethernet ports of the plurality of Ethernet ports, with N being equal to the number of links to be aggregated.

16. The CS of claim 13 wherein:
the first LAG configuration includes a plurality of links, respectively corresponding to Ethernet ports, having a first degree of link aggregation; and
the second LAG configuration includes the plurality of links having a second degree of link aggregation that is greater than the first degree of link aggregation.

17. The CS of claim 16 wherein each Ethernet port includes a respectively corresponding network interface controller (NIC) port.

18. The CS of claim 13 wherein the optimal network utilization level is based, at least in part, upon a workload being performed by the computing system.

* * * * *